Nov. 25, 1947.   C. H. SAUER   2,431,426
VEHICLE BRAKE
Filed July 28, 1943   3 Sheets-Sheet 1
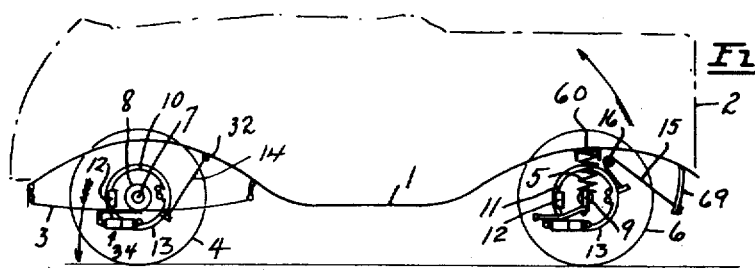
*Fig. 1.*
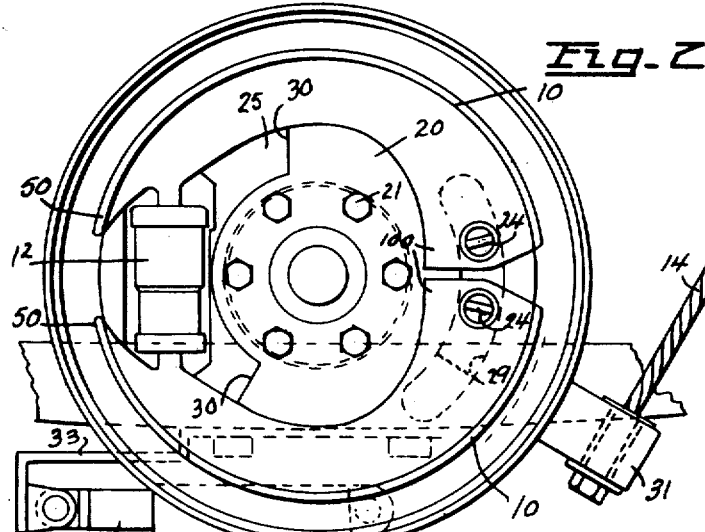
*Fig. 2.*
*Fig. 3.*
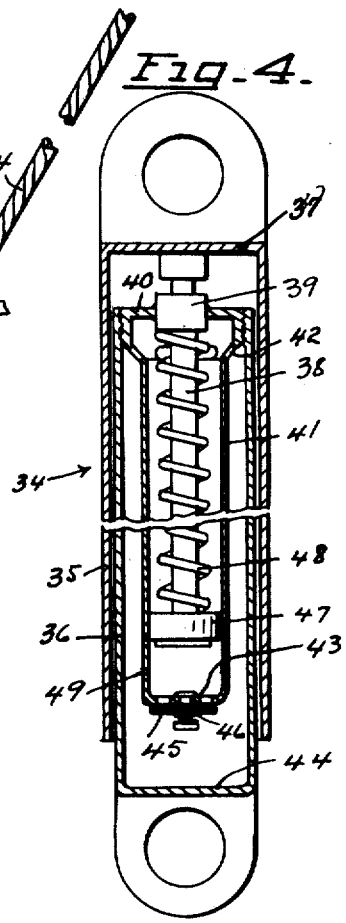
*Fig. 4.*
INVENTOR.
CHRISTIAN H. SAUER
BY
Baxter, Mohler & Becker
ATTORNEYS.

Nov. 25, 1947.    C. H. SAUER    2,431,426
VEHICLE BRAKE
Filed July 28, 1943    3 Sheets-Sheet 2
Fig. 5
Fig. 6
Fig. 7
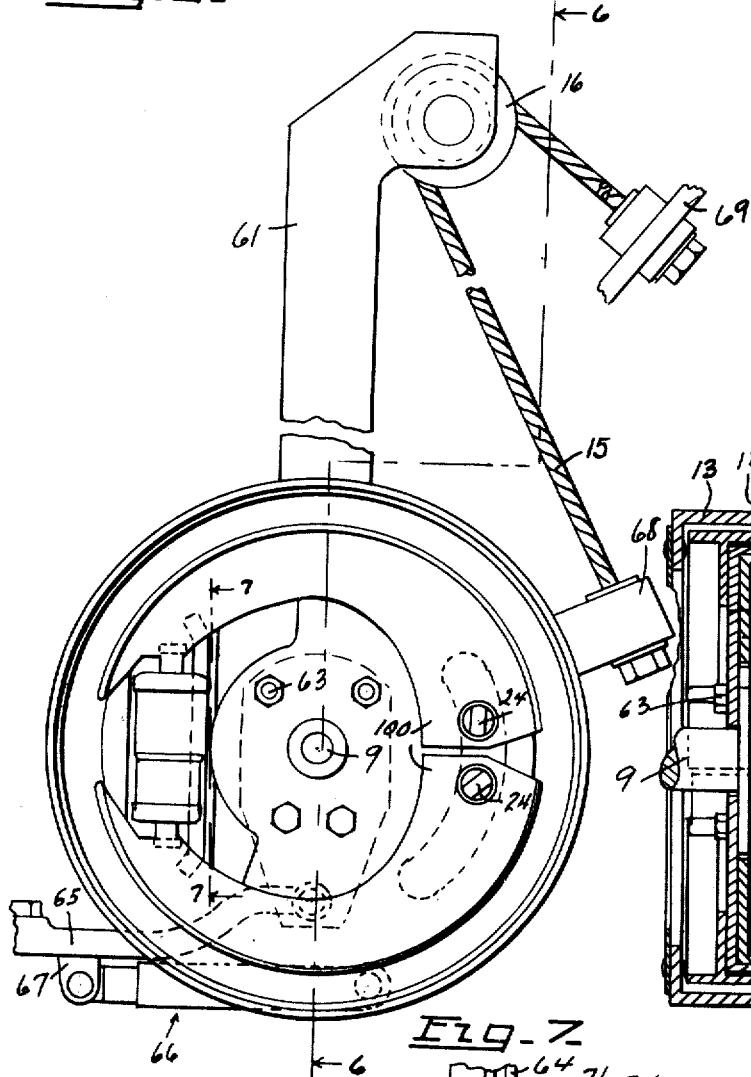
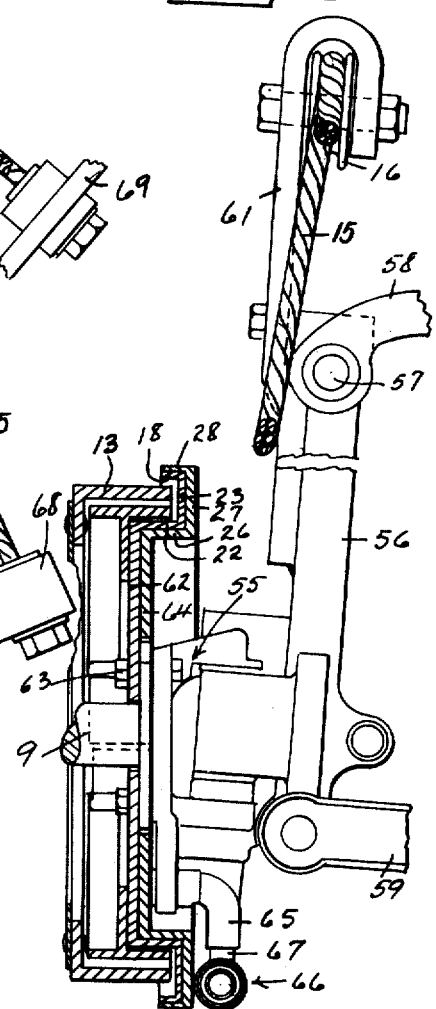
INVENTOR.
CHRISTIAN H. SAUER.
BY
Boyken, Mohler & Beckley
ATTORNEYS.

Nov. 25, 1947.  C. H. SAUER  2,431,426
VEHICLE BRAKE
Filed July 28, 1943  3 Sheets-Sheet 3
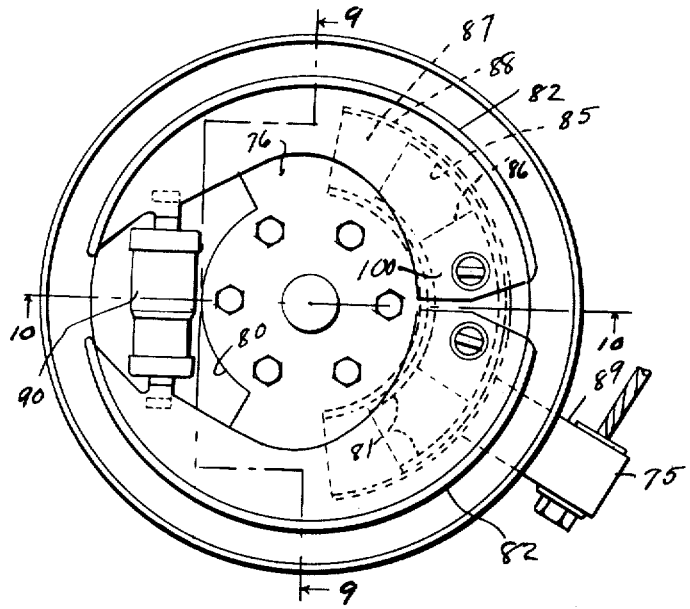
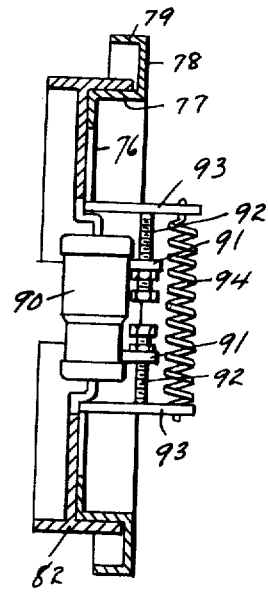
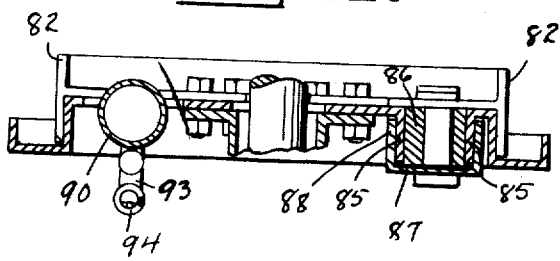
INVENTOR.
CHRISTIAN H. SAUER
BY
*Boyken Mohler & Beekley*
ATTORNEYS.

Patented Nov. 25, 1947

2,431,426

UNITED STATES PATENT OFFICE 2,431,426

VEHICLE BRAKE

Christian H. Sauer, Chico, Calif., assignor to J. T. Alm, Chico, Calif.

Application July 28, 1943, Serial No. 496,422

12 Claims. (Cl. 188—2)

1

This invention relates to a vehicle wheel brake and has for one of its objects the provision of a simple, rugged brake so constructed and connected with the body or frame of the vehicle as to coordinate the weight of the body and frame, the inertia created therein in a moving car, the torque of the rotating wheel, and the centrifugal effect of the wheel in a manner so that all forces will contribute toward more efficiently slowing down or stopping the vehicle when the brakes are applied than heretofore, and at the same time overcome the objectionable features heretofore present, particularly where the brakes are applied quickly and severely when the vehicle is moving at a relatively high speed. Some of these objectionable features are the swaying, lurching, and skidding of the vehicle and the violent throwing of the occupants or objects in the car forwardly.

Another object of the invention is the provision of improved structure in a brake system generally of the type disclosed in my co-pending applications for United States Letters Patents, Serial Nos. 453,501 and 482,851, (Patent No. 2,395,072, February 19, 1946), respectively filed on August 4, 1942, and on April 13, 1943, whereby a more rugged structure is provided and a smoother, more desirable, and more efficient and reliable braking effect is accomplished.

A still further object is improved safety means in a brake of the character described generally in my said co-pending applications, for insuring against failure of the brakes under unexpected conditions and possible accidents.

Other objects and advantages will appear in the description and in the drawings.

In the drawings,

Fig. 1 is a diagrammatic side view of a vehicle including a front and rear wheel and the general positon of the main elements of a front and rear wheel brake of this invention including their connections with the vehicle frame.

Fig. 2 is an enlarged elevational view of the rear brake elements with the brake drum removed. A fragment of the vehicle frame and the connection between such frame and the brake are also shown.

Fig. 3 is a vertical sectional view through the rear brake in which the drum is indicated and also the axle (in elevation) and rear axle housing.

Fig. 4 is an enlarged sectional view through a stabilizer element indicated in Fig. 1. The element is positioned vertical in Fig. 4 although it is indicated in Fig. 1 as being horizontal, the

2 change in position being to accommodate the view, Fig. 4 to the sheet.

Fig. 5 is an elevational view of one of the front brake assemblies associated with axles of the independent suspension, or "knee action" type. The brake drum is omitted from Fig. 5, it being conventional.

Fig. 6 is a sectional view taken generally along line 6—6 of Fig. 5, but with the drum indicated in position.

Fig. 7 is a fragmentary sectional view taken along line 7—7 of Fig. 5.

Fig. 8 is an elevational view of a modification of the structures of Fig. 2, the drum being removed.

Fig. 9 is a sectional view along line 9—9 of Fig. 8.

Fig. 10 is a sectional view along line 10—10 of Fig. 8.

Referring to Fig. 1, one of the side frame members of an automobile or vehicle is indicated at 1. A body 2 is carried on this frame and rear, semi-elliptical springs 3 yieldably support the rear ends of the body and frame on the rear wheels 4, while coil or spiral springs 5 yieldably support the forward ends of the body and frame on the independently supported front wheels 6. Each rear wheel is secured on a power driven axle 7 rotatable within a fixed axle housing 8 in the usual manner, while each front wheel is rotatable on a non-rotatable axle or spindle 9 in the usual manner, each of said latter axles being independently supported to provide what is commonly known as "knee action." Rear brake shoes 10 and front brake shoes 11 are on the rear and front wheels respectively, said shoes being movable by hydraulic pressure in cylinders 12 connected therewith, into and out of engagement with a drum 13 respectively secured to each wheel for movement therewith. The shoes 10, 11 and cylinders 12 are supported for revolvable movement with the drum respectively adjacent thereto, but this movement is limited in the case of the rear shoes by a flexible link 14 that connects the shoes with frame member 1, while the front shoes are connected with the frame by a flexible link 15. Each link 15 extends upwardly from the shoe or shoes connected thereto and then over a roller 16, and from each roller 16 each link 15 extends forwardly for securement at its forward end to a rigid connection with the frame or body at any one of several points, but preferably at a level below that of rollers 16, and said rollers are supported on one of the front spindles, or on some part rigid therewith so as to be unaffected by the front springs 5.

Each rear brake comprises a backing plate 20 (Fig. 3) rigidly secured to the axle housing 8, as by bolts 21. The backing plate 20 is substantially a circular disk and is formed with an annular flange 22 at its periphery, which flange projects inwardly or toward the center of the vehicle. The flange 22 is formed with an annular rim 23 extending at right angles thereto, and radially outwardly therefrom. Thus the flange 22 and rim 23 together form an annular ring of right angle cross-sectional contour, the rim portion 23 extending transversely past one of the edges of the shoes 10.

The shoes 10 are of almost the conventional type, each being of T-shape in cross-sectional contour, and being a substantially semi-annular segment. The head carries the brake lining and the leg of each shoe is pivotally anchored at one end to a conventional shoe-adjusting bolt 24 (Fig. 2) while the opposite ends of the shoes are secured to pistons (not shown) in an hydraulic cylinder 12, the pistons and cylinder being the usual structure and being in a conventional hydraulic system. The shoes are normally held by a spring (Fig. 7) so that their linings are held in a position spaced from the drum, but upon separation of the pistons in the cylinder by fluid pressure between said pistons, the shoes will be forced apart, expanding the spring connecting them, until the linings of the shoes are in frictional engagement with the drum. This is all conventional structure and the manner of spreading the shoes is old.

Against the inner side of the backing plate 20 is a bearing member 25 (Fig. 3) that is of disk form, like the backing plate, and which member has a flange 26 in sliding contact with the flange 22, and a rim 27 in sliding engagement with the rim 23. The outer edge of rim 27 carries a narrow flange 28 that is adapted to extend over and in slidable engagement with a corresponding flange 18 on rim 23 and over a marginal portion of the drum 13. This bearing member, which may be said to include flange 26, rim 27, and flange 28 as well as the disk 25 is rotatable on the backing plate, and relative to the latter. The forming of this member so as to fit against the flanges 22, 18 and rim 23 of the backing plate as well as fitting against plate 25 itself, provides an extremely large area supported on the backing plate, particularly near the periphery of the latter and near the periphery of the drum.

The bolts 24 extend through an arcuate slot 29 in the backing plate and are secured to the bearing member 25, and also the backing plate 20 is cut away as at 30 (Fig. 2) to accommodate movement of cylinder 12 and said cylinder may be secured to member 25 by any suitable means.

A cable clamp 31 is preferably secured to the peripheral portion of the bearing member 25 forwardly of axle 7 and below the level of the latter, as best indicated in Fig. 2, although this position may vary under certain conditions. Clamp 31 is secured to one end of cable 14 while the opposite end of the cable is secured to side frame member 1 by means of a clamp 32 that may correspond in structure to the clamp described in my said co-pending application, Serial No. 482,851. Preferably the cable 14 extends slantingly upwardly and forwardly from the clamp 31.

Connecting plate 25 with some stationary part of the vehicle such as an extension 33 of the spring clamp (Figs. 2, 3) is a spring check or stabilizer generally designated 34. Fig. 4 is an enlarged sectional view of this device 34, which comprises an outer cylinder 35 and an inner cylinder 36 telescopically extending into cylinder 35. The head end of cylinder 35 is pivotally connected to the rim portion 27 of member 25 and the head end of the inner cylinder 36 that projects from cylinder 35 is pivotally secured to the extension 33.

Secured to head 37 of the outer cylinder is a rod 38 (Fig. 4) which rod extends through a packing gland 39 in the end wall 40 of the inner cylinder 36 that is nearest head 37.

Secured to head 40 is a cylinder 41 spaced within cylinder 36, and coaxial with the latter. This cylinder 41 has ports 42 therein adjacent head 40, and it also has a head 43 that is adjacent the head 44 of cylinder 36 remote from head 40. The head 43 is formed with a relatively large opening normally closed by a valve disc 45 that is held against the outer side of head 43 by a spring 46.

On the outer end of rod 38 within cylinder 41 is a piston 47, and an expansion spiral spring 48 reacts between the piston 47 and head 40 to tend to hold the cylinders 35, 36 in collapsed relation at all times. Oil or a liquid preferably fills the cylinders 36, 41.

By the above structure the cylinders 36, 41 may readily move toward collapsed position, since the valve 45 will open to permit such movement and the spring 48 will assist, while any force tending to pull the cylinders apart will meet with such resistance as is created by the oil passing through restricted openings 49 adjacent valve 45. Of course, valve 45 may itself be provided with openings similar to openings 49 if desired. The main result to be obtained is that of checking movement of the cylinders apart while permitting their free movement toward collapsed position, and means yieldably holding them in the latter position.

In operation, insofar as the rear brakes are concerned, immediately upon application of the rear brake shoes to drum 13 by actuation of the conventional foot pedal (not shown) the frictional resistance between said shoes and drum will immediately transfer the torque force of the revolving wheel to the shoes and as the shoes are anchored to plate 25, this force will be transmitted through the plate to cable 14 and to the rear end of frame 1.

It is understood, of course, that each rear wheel carries the same elements and that a cable from each rear brake extends to each side frame member 1.

The transmission of this force to the frame members 1 will pull the rear end of the frame and body of the vehicle downwardly, increasing the traction between the rear wheels and the ground, and also stabilizing the body against lurching or swaying. The point where cables 14 are secured to side frame members 1 has a considerable effect upon the effect that the application of the rear brakes has upon the body, and where the cable clamps 31 are relatively close to the brake drums, the clamps 32 should be forwardly relative to points above clamps 31.

The action of the stabilizers 34 is quite desirable, since they keep cables 14 taut and upon compression of springs 3 resulting from an application of the rear brakes, the stabilizer prevents a sudden release of the compressed springs, although they in no way obstruct compression of the latter. This checking of the expansion of springs 3 also materially contributes to stabilizing the body against objectionable bounding on rough roads or when the vehicle passes over obstacles irrespective of action of the brakes.

Insofar as the rear brake structure is concerned, I have found that it is preferable to extend the shoes 10, as at 50, over the cylinder 12 so as to increase the braking surface, and by providing the cut away portion 30 in plate 20, the cylinder 12 can be positioned sufficiently near to the axle 7 to permit the shoes to extend past the cylinder, also this keeps the brake drum true.

In referring to the front brake construction illustrated in Figs. 5, 6 the principal differences between said front brakes and the rear brakes is the connection between the shoes and frame. Of course, there is no axle housing for the front axles, since the front spindles are stationary except for their movement for steering.

The axles 9 supporting the front steering wheels of an automobile are generally named steering knuckles, and each axle with its arms or yoke-like element 55 rigid therewith constitutes the steering knuckle assembly. This steering knuckle support, the latter including an arm 56 that extends upwardly from the element 55 and is pivotally connected at 57 to the usual upper control arm 58.

The steering buckle support 55 at the lower end of arm 56 is pivotally connected to a lower control arm 59, and in the conventional structure the front frame cross member 60 (Fig. 1) is disposed at its ends between arms 58, 59 and is supported at said ends by springs 5. All this is conventional practice, and in going over irregularities, the front wheels are suspended independently of each other for moving up and down.

The roller 16 associated with each front wheel is carried on a bracket 61 that is secured rigidly to the steering knuckle support, although it may be secured to the steering knuckle assembly, and may turn with the wheel in steering.

Referring now to the brake itself, the backing plate 62 is secured rigidly to the steering knuckle assembly, as by bolts 63 (Fig. 5). This backing plate has exactly the same structure as the backing plate 20 for the rear brake except for the fact that it is secured to the steering knuckle assembly instead of to the axle housing, hence the same numbers will be used to designate the structure that is similar, namely: flange 22 and rim 23.

A bearing member 64 is associated with each backing plate on each front wheel. These bearing members for the front wheels respectively, are each identical with the bearing members of the rear wheels, each having a flange 26 against flange 22 of the backing plate and a rim member 27 against the rim member 23, and a small flange 28 extending over the drum 13.

The steering knuckle assembly has the usual steering knuckle arm 65 secured thereto, the latter being adapted to be pivotally connected at its outer end with the conventional steering tie rod (not shown). Arm 65 turns with the wheel and brake, and a stabilizer, generally designated 66 that is identical with the stabilizers 34 of the rear wheels, is pivotally secured at one end to a lug 67 secured on said arm 65, while the opposite end of the stabilizer is pivotally secured to the bearing member 64 at its rim portion 27 as indicated in Fig. 5.

There is one of these stabilizers for each front wheel, and as each is identical in its structure and manner of operation to the stabilizers 34 of the rear wheels, no further description is thought necessary, other than to say that the free upward swinging of the front end of the vehicle is checked by these stabilizers.

Secured to each bearing member 64 adjacent its periphery is a cable clamp 68 identical with cable clamps 31, only the clamps 68 are positioned forwardly of and above the level of each steering knuckle or axle 9 adjacent thereto.

As already described, the cable 15 extends upwardly and rearwardly from each clamp 68 to roller 16, and then over such roller and forwardly to any suitable member 69 that may be secured rigid to the frame of the vehicle (Fig. 1).

Preferably the length of the cable 15 between each frame member 69 and each roller 16 is inclined downwardly. Thus when the front brakes are actuated the front shoes 11 will tend to be carried with the bearing members 64 around the steering knuckles and the braking torque will be transmitted to the forward end of the vehicle frame for elevating the latter and to resist any forward movement of the body and frame relative to the steering knuckles. If the cables 15 are connected to the lower ends of frame members 69, the lifting effect will be greater than where the cable between rollers 16 and the frame members 69 are more nearly horizontal. Thus, any desired effect can be procured which is quite important since each vehicle may vary insofar as the springs are concerned, and each driver may have a preference as to the action he desires. In any event, however, the lifting action on the front end of the vehicle so as to counteract the tendency of the front end to dip when the brakes are applied, is desired and preferable.

The front brakes themselves are like the rear brakes, and the shoes have greater braking surfaces than heretofore. In both the front and rear brakes, with my invention, the arrangement of the shoes with one above the other, and with their anchor pins or brake-shoe adjusting bolts 24 forward relative to the forward direction of travel of the vehicle is highly desirable.

In both the front and rear brakes, a spring 70 (Fig. 7) is secured to lugs 71 that are respectively secured to the shoes adjacent the hydraulic cylinder 12. These lugs extend through the cut away portion of the backing plate. A cross bar 72 secured at its ends to each bearing member carries coaxially aligned adjusting screws that threadedly extend through lugs 73 secured to said cross bar, said screws being adapted to engage the lugs 71 on the brake shoes. Spring 70 pulls the free ends of the shoes toward each other so that said lugs 71 will engage screws 74, and by adjusting the screws 74 the spacing between the free outer ends of said shoes and the brake drum can be regulated.

As cross bar 72 and the shoes and cylinder 12 and spring 70 are revolvable as a unit, any adjustment of the shoes will be maintained.

The modified form shown in Figs. 8, 9, 10 is equally adapted to the front and rear wheels, it being understood that the position of the cable clamp 75 indicated in Fig. 8 is merely changed to the position of clamp 68 of Fig. 5 for front brakes and the backing plate may be readily changed for bolts 63 (Fig. 5).

In Figs. 8, 9, 10 the backing plate 76 generally corresponds to backing plate 20 of Figs. 2, 3 having a flange 77 and rim 78 corresponding to flange 22 and rim 23, but said rim 78 carries the flange 79 at its periphery that corresponds with the flange 28 that is carried by rim 27 of the bearing member in Fig. 3. This flange 79 is rigid with the rim 78 and the backing plate itself is formed with segmental slots 80, 81 that are concentric with the central axis of the plate.

Shoes 82 of the same kind as shoes 10, 11 are arranged so that one side of the head of each is over the flange 77 (Fig. 9) and the web or leg of each shoe is against plate 76.

As best shown in Fig. 10, the plate 76 is formed with opposed flanges 85 extending parallel with flange 77 alongside opposite edges of slot 81, and between these flanges 85 is slidably supported a block 86 to which the shoes 82 are pivotally anchored. Block 86 is considerably shorter than the length of slot 81, and is therefore, free to move in the slot lengthwise of the latter.

A cap 87 is secured to block 86 and has sides 88 extending over and in slidable engagement with the opposite outer sides of the flanges 85. Said sides 88 may extend practically the full length of the flanges 85 or even beyond the ends of the latter.

The cable clamp 75 is secured to cap 87 in any suitable manner, as by an arm 89.

The hydraulic brake actuating cylinder 90 is adapted to extend partially in slot 80 and may carry lugs 91 through which axially aligned screws 92 extend into engagement with arms 93 that are secured to the webs of shoes 82. A spring 94 connects the arms 93 and yieldably holds them in engagement with screws 92.

This modified structure eliminates some of the structure of the preceding brakes, and is suitable for use where the load to be stopped by the brakes is not too great. Even in trucks and buses, however, by designing the parts sufficiently heavy the structure is satisfactory, since considerable bearing surfaces are provided.

In all forms of the invention an absolute safety means is provided irrespective of what happens to the cable connection between the brakes and the body, and this is very important, since in actual operation accidents may occur that might sever one or more of the cables, and if no safety were provided, the hydraulic line leading to each cylinder 12 would be severed and the brakes rendered inoperative.

In Fig. 2 the brake shoe adjusting bolts are adapted to engage one end of slot 29 upon application of the brakes when the vehicle is in reverse, and this engagement is not harsh or sharp since the stabilizer prevents free reverse revolution of the brake shoes. Of course, the action is the same in reverse as when the vehicle is moving forwardly, namely; the rear end is depressed and the front end is elevated.

In the event of breakage or slippage of any of the cables 14, 15, the brake shoe adjusting bolts 24 will engage the opposite end of the slot 29, and the brakes will function in the conventional manner.

In the modified form the block 86 will engage one end of the slot 81 when the brakes are applied to a vehicle moving in reverse, while the block will engage the opposite end of the slot should the cables break.

Thus, it is seen that means is provided for insuring against any failure of operation due to some unforeseen accident. The hydraulic hose leading to each cylinder has ample length to permit the movement of the cylinder within the limits of the slots in the backing plates.

Another highly desirable feature that is present in all forms of the invention is the widening of the web or leg of each shoe at 100, adjacent the adjusting bolts 24. This widening of the shoes at this point provides an appreciable increase in the bearing surface between said web and the stationary backing plate 20. The positioning of the springs 70 and 94 on the sides of the brake nearest the body or adjacent the bearing members 25, 64 or 76, holds the brake shoes in correct positions relative to the backing plate, whereas the brake shoes would tend to become mis-adjusted and would rattle, were the springs 70, 94, respectively positioned at the opposite side of the backing plate.

All of these features are particularly important with respect to brakes of the character herein disclosed.

Insofar as the action of the brake assemblies is concerned, in all of the forms in automobiles or vehicles having front and rear wheels and a spring supported body, an application of the front and rear wheel brakes will cause the rear end of the body to go down and the front end to go up, which is exactly the reverse of the normal action. The degree to which the front end is elevated and the rear end is depressed is dependent upon many factors, such as (a) speed at which the vehicle is moving, (b) force applied to brakes, (d) type and character of main springs, (e) points of connection between cables and body, (f) distances cable connections with brakes are from wheel axes respectively, (g) diameter of tires relative to distance each cable connection to brakes is from periphery of each tire, (h) position of point where each cable connects with each brake relative to ground and to vehicle and on circle concentric with axis of each wheel.

Where the body is tilted by application of the brakes so that the forward end is elevated, there is no tendency for the occupants to be thrown forwardly. The sensation is one of being more firmly seated in the vehicle. Also this tilting results in a shifting of the weight center rearwardly, and whereas now the front brakes in automobiles are made to take from 65 to 80% greater load than the rear brakes, with my invention all brakes substantially take the same load. This materially contributes to the fact that skidding is practically eliminated where my brake system is used.

The connecting of the stabilizers to the rotating or revolving portion in each brake very greatly increases the efficiency of the stabilizers for absorbing shocks, since there is no direct upward transmission of shocks to the body. The springs take all upward shock as they compress freely uninfluenced by the stabilizers, and then the stabilizers releasably lock the body against any rebound, as occurs at present, and when the brakes are applied as the vehicle is traveling at high speed, each impact on the wheels results in tightly (but releasably) locking the body to the wheels so as to maintain the vehicle under easy and full control by the driver.

It is pertinent to note that after the vehicle has stopped and the brakes are applied, the stabilizers permit the smooth and gradual release of the compressed body springs so that the body will assume its normal position automatically.

I claim:

1. In a brake system of the character described, a wheel brake that includes a brake drum and a brake shoe supported for movement into and out of frictional engagement with said drum, a stationary axle coaxial with said drum, a wheel coaxial with said drum and axle carrying the former rigid therewith and rotatably relative to the latter, a backing plate rigidly secured to said axle and extending radially thereof past said shoe and formed with a bearing surface adjacent said shoe and concentric with the axis of rotation of said wheel, a member supported on said bearing for movement thereon about said axis, means securing said shoe to said member for movement therewith, a projection secured to said member extending radially outwardly therefrom and from said drum relative to said axis, and a generally vertically extending link secured at its lower end to the outer end of said projection, and means for anchoring the upper end of said link to a vehicle body adapted to be carried on said axle.

2. In a brake system of the character described, a wheel brake that includes a brake drum and a brake shoe supported for movement into and out of frictional engagement with said drum, a stationary axle coaxial with said drum, a wheel coaxial with said drum and axle carrying the former rigid therewith and rotatably relative to the latter, a backing plate rigidly secured to said axle and extending radially thereof past said shoe and formed with a bearing surface adjacent said shoe and concentric with the axis of rotation of said wheel, a member supported on said bearing for movement thereon about said axis, means securing said shoe to said member for movement therewith, and means for anchoring said member to a vehicle body adapted to be carried on said axle, said backing plate being substantially disk-like and having a flange rigid therewith on which said bearing surface is provided, said backing plate being formed with an opening adjacent said flange, and a pivot extending through said opening connecting said shoe with the said member and pivotally supporting said shoe for its said movement into and out of engagement with said drum.

3. In a brake system of the character described, a wheel brake that includes a brake drum and a brake shoe supported for movement into and out of frictional engagement with said drum, a stationary axle coaxial with said drum, a wheel coaxial with said drum and axle carrying the former rigid therewith and rotatably relative to the latter, a backing plate rigidly secured to said axle and extending radially thereof past said shoe and formed with a bearing surface adjacent said shoe and concentric with the axis of rotation of said wheel, a member supported on said bearing for movement thereon about said axis, means securing said shoe to said member for movement therewith, and means for anchoring said member to a vehicle body adapted to be carried on said axle, said backing plate being substantially disk-like and having a flange rigid therewith on which said bearing surface is provided, a hydraulically actuated element connected with said shoe for moving the latter into engagement with said drum, and said element being movable with said shoe relative to said backing plate.

4. In a brake system of the character described, a wheel brake that includes a brake drum and a pair of brake shoes pivotally supported for movement into and out of engagement with said drum, a rotatable ground wheel coaxial with said drum carrying the latter for revolving therewith, a stationary backing plate and a member carrying the pivots for said shoes supported on said backing plate for limited revolvable movement relative to the latter about the axis of said wheel and drum, a hydraulic motor means connected with said shoes for causing their said movement into engagement with said drum, a spring for moving said shoes out of engagement with said drum when said hydraulic motor means is inoperative, said motor means and spring being revolvable with said shoes and member relative to the wheel axis, and a generally vertically extending link pivotally connected at its lower end to said member and adapted to be pivotally connected at its opposite end to a body to be sprung on said wheel.

5. A brake system in a vehicle having front and rear ground wheels with axles rotatably supporting the latter and which axles carry springs yieldably supporting a body over said axles; a brake drum rigid with each wheel and coaxial therewith, a stationary bearing carried by each axle concentric with the axis of the latter, a brake shoe for each drum movable into and out of engagement therewith and supported on each bearing for movement relative to the latter about the axis of each wheel, a flexible link connecting each shoe and the body of the vehicle for limiting said movement of each shoe when the latter is in frictional engagement with each drum, the links connecting the respective shoes of the rear wheels and the body extending slantingly forward and upward from each of the shoes, and the links connecting the respective shoes of the front wheels and the body extending upwardly and forwardly relative to said shoes and being connected to the body at their forward ends, a roller supporting each of said last mentioned links at the respective points where they change direction for movement of the links relative thereto, and means rigid with the axles that support said front wheels respectively supporting said rollers.

6. In a brake system of the character described for a vehicle having a ground wheel and a brake therefor that includes a brake drum and a brake shoe supported for movement into and out of frictional engagement with said drum, means so supporting said shoe for said movement, said means including a bearing secured against rotation with said drum and a bearing member movable on said bearing about the axis of said drum, a link secured to said member adapted to connect said member with the body of such vehicle, said bearing comprising an elongated slot formed with parallel opposed sides extending concentrically relative to the axis of said drum, said bearing member being a block between said sides slidable longitudinally of the slot, and said link being secured at one of its ends to said block.

7. In a brake system of the character described for a vehicle having a pair of front wheels supporting the front end of a body thereon, and a pair of brakes for said wheels; each of said brakes comprising a drum secured to each wheel and a pair of shoes therein carried by said wheel for movement relative thereto and to said drum, each of said pair of shoes being supported for movement into and out of engagement with the drum, a bearing member secured to each pair of shoes, and a bearing carried by each wheel supporting said member for revolvable movement of the latter about the axis of said drum relative to the latter, a pair of links respectively connected to said bearing members, and means for connecting each of said links to the said front end of said body.

8. In a brake system of the character described for a vehicle having a pair of front wheels supporting the front end of a body thereon, and a pair of brakes for said wheels; each of said brakes comprising a drum secured to each wheel and a pair of shoes therein carried by said wheel for movement relative thereto and to said drum, each of said pair of shoes being supported for movement into and out of engagement with the drum, a bearing member secured to each pair of shoes, and a bearing carried by each wheel supporting said member for revolvable movement of the latter about the axis of said drum relative to the latter, a pair of links respectively connected to said bearing members, and means for connecting each of said links to the said front end of said body, a steering knuckle supporting each of said wheels for rotation on the ground and for swinging about separate vertically extending axes for steering; means supporting each of said links for swinging with each of said wheels free from interference therewith.

9. In a brake system of the character described for a vehicle having a pair of front wheels supporting the front end of a body thereon, and a pair of brakes for said wheels; each of said brakes comprising a drum secured to each wheel and a pair of shoes therein carried by said wheel for movement relative thereto and to said drum, each of said pair of shoes being supported for movement into and out of engagement with the drum, a bearing member secured to each pair of shoes, and a bearing carried by each wheel supporting said member for revolvable movement of the latter about the axis of said drum relative to the latter, a pair of links respectively connected to said bearing members, and means for connecting each of said links to the said front end of said body, each of said links being flexible and extending upwardly and then forwardly and downwardly from said member, a pulley so supporting each of said links, and forward ends of said links being secured by said last mentioned means to such body.

10. A brake for a ground wheel of a vehicle that includes a drum secured to said wheel for revolving therewith and a pair of arcuately extending elongated brake shoes inside said drum substantially concentric therewith and pivotally supported at one of their ends for swinging into and out of frictional engagement with said drum; a plate having an annular flange coaxial with said drum positioned adjacent said shoes; means securing said plate secured against rotation with said drum; a bearing member to which said shoes are so pivoted at one of their said ends; said bearing member being formed with an annular element concentric with said flange and supported thereon for revolvable movement relative thereto; and a link adapted to connect said bearing member to a vehicle body to be supported on said wheel, said plate being formed with an opening therein adjacent the said pivoted ends of said brake shoes for pivoting the said shoes to said bearing member, and said bearing member being positioned at the side of said plate opposite said shoes, a spring connecting the ends of said shoes that are opposite their pivoted ends for yieldably urging said shoes away from said drum, said spring being on the same side of said plate as said bearing member for tending to hold said shoes concentric relative to said drum and against said plate.

11. In a brake system of the character described for a vehicle having a ground wheel and a brake therefor that includes a brake drum and a brake shoe supported therein for movement into and out of engagement with said drum; means so supporting said shoe for said movement; means supporting said shoes for revolvable movement relative to said drum; a cylinder and a piston reciprocable therein respectively connected with said shoe and with a fixed part of said vehicle for movement of the cylinder and piston to collapsed position upon application of said shoes to said drum, and means in said cylinder resisting reciprocable movement of said cylinder and piston in the opposite direction to an extended position of the cylinder and piston relative to each other.

12. In a brake system of the character described for a vehicle having a ground wheel and a brake therefor that includes a brake drum and a brake shoe supported therein for movement into and out of engagement with said drum; means so supporting said shoe for said movement; means supporting said shoes for revolvable movement relative to said drum; a cylinder and a piston reciprocable therein respectively connected with said shoe and with a fixed part of said vehicle for movement of the cylinder and piston to collapsed position upon application of said shoes to said drum, and means in said cylinder resisting reciprocable movement of said cylinder and piston in the opposite direction to an extended position of the cylinder and piston relative to each other; a spring supported body carried by said wheel; said body carrying said fixed part rigid therewith; a spring in said cylinder reacting between said cylinder and piston for urging said piston and cylinder to said collapsed position at all times, and a link connecting said shoes with said body for limiting movement of said shoes in one direction upon said application of the latter to said drum; means comprising said link and the springs supporting said body for moving said piston and said cylinder to said extended position.

CHRISTIAN H. SAUER.

REFERENCES CITED

The following references are of record in the file of this patent:

UNITED STATES PATENTS

| Number | Name | Date |
| --- | --- | --- |
| 1,605,404 | Hewitt | Nov. 2, 1926 |
| 2,078,210 | Sanford | Apr. 20, 1937 |
| 2,140,741 | Geopfrich | Dec. 20, 1938 |

FOREIGN PATENTS

| Number | Country | Date |
| --- | --- | --- |
| 735,309 | France | Jan. 6, 1936 |
| 290,442 | Germany | Feb. 29, 1916 |
| 398,370 | Germany | June 2, 1911 |